United States Patent [19]

Ton-that

[11] Patent Number: 5,587,850

[45] Date of Patent: Dec. 24, 1996

[54] DATA TRACK PATTERN INCLUDING EMBEDDED SERVO SECTORS FOR MAGNETO-RESISTIVE READ/INDUCTIVE WRITE HEAD STRUCTURE FOR A DISK DRIVE

[75] Inventor: Luan Ton-that, San Jose, Calif.

[73] Assignee: Quantum Corporation, Milpitas, Calif.

[21] Appl. No.: 296,643

[22] Filed: Aug. 26, 1994

[51] Int. Cl.⁶ ................................................. G11B 5/596
[52] U.S. Cl. ..................................... 360/77.08; 360/77.06
[58] Field of Search ............................ 360/77.08, 77.07, 360/113

[56] References Cited

U.S. PATENT DOCUMENTS

| | | | |
|---|---|---|---|
| 4,504,880 | 3/1985 | Church et al. | 360/113 |
| 4,575,775 | 3/1986 | Albrecht | 360/77 |
| 4,669,004 | 5/1987 | Moon et al. | 360/77.08 X |
| 4,783,705 | 11/1988 | Moon et al. | 360/77 |
| 4,802,033 | 1/1989 | Chi | 360/77.04 |
| 5,170,299 | 12/1992 | Moon | 360/77.08 |
| 5,235,478 | 8/1993 | Hoshimi et al. | 360/77.08 |
| 5,257,149 | 10/1993 | Meyer | 360/78.14 |
| 5,369,535 | 11/1994 | Hetzler | 360/77.08 X |
| 5,384,671 | 1/1995 | Fisher | 360/77.08 X |
| 5,400,201 | 3/1995 | Pederson | 360/77.08 X |

*Primary Examiner*—Aristotelis Psitos
*Assistant Examiner*—Regina Neal
*Attorney, Agent, or Firm*—David B. Harrison; Debra A. Chun

[57] ABSTRACT

In a disk drive using a write-wide inductive write element and a read-narrow magneto-resistive read element within a head transducer assembly for writing and reading magnetic patterns on a rotating magnetic storage disk in a plurality of concentric tracks, a track pattern formed in each concentric track includes embedded servo wedges wherein each wedge includes a servo position portion which is offset from a centerline of both the servo sector and a following user data sector by an amount related to offset between the inductive write and magneto-resistive elements of the head transducer assembly. Furthermore, the servo sector contains four servo bursts. The servo bursts are arranged such that each sequential burst is offset from a previous burst by a fractional offset increment. The fractional offset increment is typically one-third of a track pitch.

5 Claims, 9 Drawing Sheets

DATA TRACK PATTERN INCLUDING EMBEDDED SERVO SECTORS FOR MAGNETO-RESISTIVE READ/INDUCTIVE WRITE HEAD STRUCTURE FOR A DISK DRIVE

FIELD OF THE INVENTION

The present invention relates to digital data storage equipment and, more particularly, to the organization of data track patterns that include embedded servo sectors for access by disk drive transducer head assemblies containing a magneto-resistive read head and an inductive write head.

DESCRIPTION OF THE BACKGROUND ART

Data storage devices employing rotating magnetic or optical media disks are known for high capacity, low cost storage of digital data. Such disks typically contain a multiplicity of concentric data track locations, each capable of storing useful information. The information stored in each track is accessed by a transducer head assembly which is moved among the concentric tracks. Such an access process is bifurcated into two operations. First, a track seek operation is accomplished to determine the track that contains the data to be recovered and, second, a track following operation is accomplish to maintain the transducer in precise alignment with the track as the data is read therefrom. Both these operations are also accomplished when data is to be written by the transducer head assembly to a specific track on the disk.

Physical positioning of the transducer head assembly is typically accomplished by a rotary actuator assembly which supports the transducer assembly at one end of the rotary actuator assembly. At an opposing end of the actuator assembly is an actuator motor that causes the actuator assembly to pivot about a centrally located axis and position the transducer head assembly over the disk. Control circuitry controls the actuator motor such that the head assembly is accurately positioned amongst the concentric tracks on the disk. Typically, the actuator motor forms a portion of a continuously positionable system (servo system) that uses a closed loop servo circuit to control the position of the transducer assembly relative to the tracks on the disk, i.e., the servo system continuously adjusts the position of the actuator assembly based upon servo information read by the transducer assembly from the disk.

In high-capacity disk drives such as those disclosed in U.S. Pat. Nos. 5,235,478 and 5,073,833, transducer head assemblies typically contain two transducers, one for reading information from the disk and another for writing information to the disk. The read transducer is a magneto-resistive head and the write transducer is an inductive head. As is well-known in the art, a magneto-resistive head is much more sensitive to recorded magnetic flux transitions than an inductive head. As such, utilization of a magneto-resistive head enables the track density to be significantly increased over the track densities associated with disk drives that use inductive heads to both read and write data to the disk.

As for the physical arrangement of the heads, the two heads are typically linearly arranged upon a slider, one head behind the other, with a relatively small gap between the two heads. Alternatively, the centerlines of each of the two heads are laterally offset from one another by a relatively small distance. Such an offset can be utilized to minimize a radial distance that the actuator assembly must be displaced or "micro-jogged" between centerlines when switching from reading to writing, or from writing to reading operations. The slider upon which the heads are mounted forms a portion of the transducer head assembly mounted to one end of the actuator assembly.

Generally, the head arrangement described above is known as a write-wide, read-narrow head arrangement. Specifically, the inductive write head has a electrically wide linear region, e.g., approximately one-fourth of a nominal track width (track pitch). On the other hand, the magneto-resistive read head has a linear region that is approximately 16% of the track pitch. Because of this narrow reading width, disk drives, such as that disclosed in U.S. Pat. No. 4,783,705 commonly assigned to the assignee hereof, utilize servo sectors comprising multiple servo bursts arranged within a single track. In effect, the track pitch is different (smaller) for the servo sectors as compared to the data sectors. As such, the narrow effective width of the read head will always pass over at least one of the multiple servo bursts even though the head may be mistracking the center of the data track. Consequently, by reading the servo bursts beneath the read head, the servo system can reposition the head in the center of the data track.

One disadvantage of using a transducer head assembly having two, spaced apart transducer heads on a rotary actuator assembly is that, as the transducer head assembly is positioned relative to the concentric tracks, a skew angle between the transducers heads becomes apparent. Specifically, if the transducer heads were perfectly aligned, one behind the other, over a given track near the outer diameter of a disk, as the transducer head assembly is moved toward the inner diameter of the disk, the transducer heads skew relative to an underlying track. To compensate for this effect, the two heads are laterally offset from one another. As such, the two heads are typically aligned with a track near the center of the disk and become misaligned (skewed) with tracks on either side of the central track. Consequently, misalignment can be as much as +14% at the inner diameter of the disk and −12% at the outer diameter of the disk.

To further compensate for the skew angle, special circuitry is used to coordinate the read and write functions during track seek and follow operations. In particular, during a seek operation, the read head is used to read embedded servo information recorded within each track on the disk. The servo information is recorded in one or more so-called servo sectors. This servo information informs the actuator control electronics of the specific track number the transducer head assembly is presently passing over and the relative alignment of the head with that particular data track.

Once the desired track is found, the servo information read by the read head is used within a closed loop servo controlling the actuator voice coil motor in order to move the actuator structure to minimize a position error signal (PES) and thereby accurately align the read head with the center of the data track. Thereafter, the read head can read the data present in one or more data segments that follow each servo sector during data reading operations. Typically, the data segments are aligned with the so-called centerline of the track.

Rotary actuators inherently cause a skew angle to be manifested between the head structure and the concentric data tracks, because the head is positioned along an arc, rather than along a straight radial line. In addition, with separate write and read elements arranged in tandem within the data transducer head structure, a further skew angle or offset between the write element and the read element may be present at any particular radial track location. If a data writing to disk operation is to be carried out at the data segment being followed by the read element within the track, the write gap will be offset from the track centerline by an amount related to the head skew, and the actuator assembly must be moved a distance, known as the "micro-jog distance", in order to bring the write head into alignment with the track centerline.

In this manner, when a servo sector is encountered at the beginning of a write operation, the read element reads the head position information from within a servo sector, and the servo control loop determines the micro-jog distance. The transducer head assembly is then micro-jogged to place the write element into alignment with track centerline before the writing operation is carried out. During a writing operation spanning several servo sectors, when a next servo sector is encountered, the transducer head read element is offset by the micro-jog distance from the track centerline, and the servo loop must somehow follow the track centerline with an offset read element. This is a non-trivial design problem as each micro-jog interval requires a finite time to move the actuator structure. Tolerances or gaps, or additional disk revolutions must be provided in order to accommodate head repositioning during writing operations thus increasing the time spent on head repositioning and increasing the servo overhead of the storage disk. Thus, it is not practical to microjog the data transducer assembly back and forth when each servo sector interrupts a data track during an extended data writing operation spanning several data areas interrupted by servo sectors.

To ensure that the transducer head assembly maintains alignment with the data segments and can detect where within the track the data segments begin, two offset address fields are typically used. These address fields are also known in the art as identification (ID) fields. Such offset address fields are disclosed in U.S. Pat. No. 5,257,149, issued Oct. 26, 1993. This patent teaches using two address fields each of which contain a track number and position information concerning a particular track that is associated with the two fields. A read address field is aligned with the centerline of the data track. The read address field is followed by a write address field. The write address field is radially offset from the track centerline by a predefined distance. This predefined distance is equivalent to the micro-jog distance for that particular track. As such, the predefined distance varies with track position on the disk. The write address field is followed by a data field that is aligned with the track centerline. Using such a radially offset write address field ensures that, during data writing, the read head is centered over the write address field while the write head is centered over the data track.

During data read operation, the disk drive taught by the '149 patent uses the read address field to identify a particular track to read data from and thereafter, reads data from the data field following the read address field. However, during data write operation, the actuator assembly offsets the read head from the track center by the predefined micro-jog distance such that the read head is positioned over the write address field. As a result, although the read head is offset from the track center, the write head is positioned over the data field located at the center of the track. As such, the disk drive taught by the '149 patent compensates for the skew angle and any fixed head offset built into the transducer head assembly. Consequently, a micro-jog is only necessary to initially align the write head with the data track during write operations.

However, in small disk drives, such as a 2.5 inch form factor disk drive, the very small storage area of the 2.5 inch diameter data storage disk makes it desirable to use as much of the disk surface as possible to store data. As such, using two address fields requires and consumes recordable surface area of the disk that could otherwise be used to store user data, thereby decreasing the servo data overhead.

Therefore, there is a need in the art for a dual-head disk drive that uses only a single identification field for both read and write operations. Further, there is a need in the art to organize the servo information within a servo sector such that the absolute position of the transducer head assembly can be rapidly determined.

SUMMARY OF THE INVENTION WITH OBJECTS

A general object of the present invention is to provide a track pattern that improves user data storage efficiency by using less overhead information stored upon the disk in a manner overcoming limitations and drawbacks of the prior art.

Another general object of the present invention is to provide a track pattern having a servo sector that facilitates improved seeking and tracking performance of a head position servo control system in a manner overcoming limitations and drawbacks of the prior art.

A further general object of the present invention is to implement a data track identification and head positioning technique in order to utilize more efficiently and effectively a narrow width magnetoresistive read element for head positioning by a head position servo loop in a manner improving upon the prior art.

A more specific object of the present invention is to laterally offset the data identification field from a centerline of the servo sector and a centerline of the data sector such that a read head of a dual head transducer head assembly passes over the data identification field without requiring or employing a micro-jog to align the read head with the data identification field.

Another specific object of the present invention is to provide a servo sector containing four servo bursts arranged such that the servo system can determine an absolute position for the transducer head assembly used to read the servo bursts.

The present invention overcomes disadvantages heretofore associated with the prior art and achieves the forgoing objects through the use of an inventive track pattern and a method for reading the track pattern. Specifically, the present invention is a track pattern formed in each concentric track of a rotatable magnetic disk containing a servo wedge including a servo head position portion, and a data sector following the servo wedge. The servo head position portion is radially offset from a centerline of the data sector, so that a dual head arrangement having an offset skew (such as a write wide thin film inductive write element/read narrow magnetoresistive read element) can be used for centering during both write and read operations without requiring dual, offset head position portions. Furthermore, the servo sector contains e.g. four servo bursts The servo bursts are arranged such that a first servo burst is outwardly offset from the data sector centerline by two fractional offset increments; a second servo burst is outwardly offset from the data sector centerline by one tractional offset increment; a third servo burst is aligned with the data sector centerline; and a fourth servo burst is inwardly offset from the data sector centerline by one tractional offset increment. The fractional offset increment is typically one-third of a track pitch.

A method is provided for reading and analyzing the servo burst pattern such that the method computes an absolute position for the transducer heads. The method uses the track number and analyzes a plurality of servo burst amplitude signals to arrive at an absolute position for the transducer heads. The method also generates an error signal that indicates the misalignment, if any, of the transducer heads form a centerline of a data sector (data track). This error signal is adjusted to produce a signal that is used by the servo control system to accurately align the transducer heads with the data track centerline.

A disk drive incorporating principles of the present invention includes a base, a magnetic data storage disk rotating relative to the base, at least one data transducer assembly positioned at concentric data track locations by a rotary actuator mounted to the base and controlled by a disk drive closed loop servo circuit, the data transducer assembly carried on an air bearing slider and including a thin film inductive write element and a thin film magneto-resistive read element offset longitudinally from the write element such that a centerline of a magnetic path on the disk read by the read element is offset from a centerline of a magnetic path written to the disk by the write element by a micro-jog distance, a plurality of servo wedges embedded within each data track wherein each wedge includes for the track a servo preamble recorded at a first radial displacement relative to the centerline of the track, a single servo identification field recorded at a second radial displacement related to the micro-jog distance, and a plurality of circumferentially sequential, radially offset servo bursts having oppositely facing and aligned burst edges offset from the centerline of the track by the micro-jog distance, so that during disk drive data writing operations, the read element reads the servo preamble field, the single servo identification field, and the pair of servo bursts to obtain relative burst amplitudes therefrom in order to supply write-mode position error signals to the closed loop servo circuit to align the write element with the centerline, and during disk drive data reading operations, the closed loop servo displaces the transducer assembly from the centerline by the micro-jog distance so that the read element reads the servo preamble, the single servo identification field, and the pair of servo bursts to obtain relative burst amplitudes therefrom in order to supply read-mode position error signals to the closed loop servo circuit to align the read element with the centerline of the track.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIGS. 6A and 6B depict detailed diagrams of servo bursts and servo burst signals detected while the MR read element passes over the servo bursts depicted in FIG. 4 and FIG. 5.

To facilitate understanding, identical reference numerals have been used, where possible, to designate identical elements that are common throughout the figures.

DETAILED DESCRIPTION OF A PREFERRED EMBODIMENT

Figure 1:
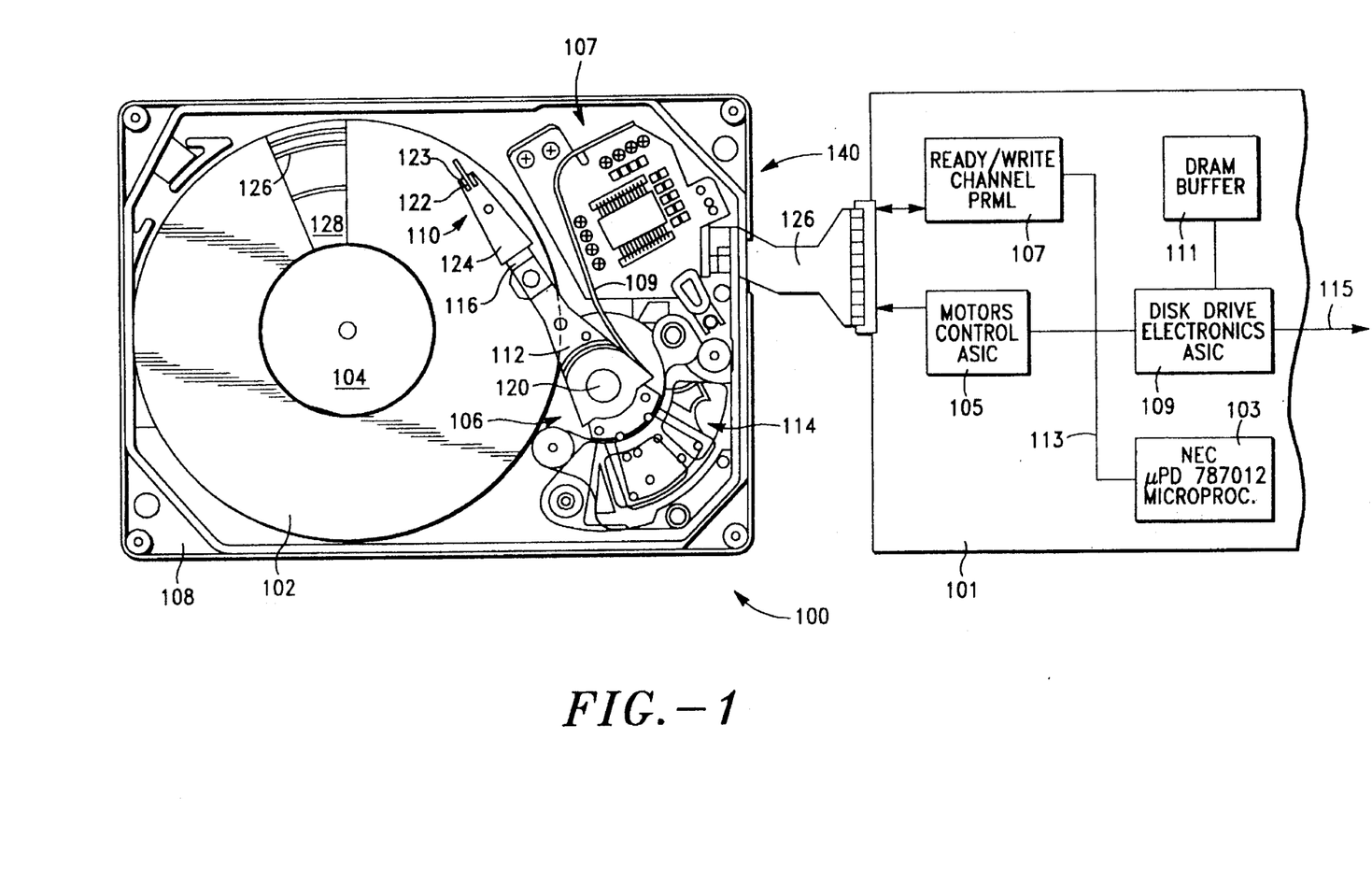
FIG. 1 depicts a top plan view of a disk drive head and disk assembly (HDA) and a block diagram of disk drive electronics that implement and utilize principles of the present invention.

FIG. 1 depicts a top plan view of a disk drive head and disk assembly (HDA) 100 and circuit board 101 incorporating principles and aspects of the present invention therein. The disk drive HDA 100 contains a rotatable magnetic storage disk 102, a DC brushless in-hub spindle motor (not specifically shown), a hub 104 containing and/or enclosing the spindle motor and spindle bearings, a rotary voice coil actuator assembly 106, a read preamplifier/head select/write driver circuit 107 connected to the rotary actuator by a flex circuit 126 enabling the HDA 100 to be connected to a disk drive electronics circuit board 101 mounted to the HDA externally of the interior thereof, and a base housing 108 to which the various components of the disk drive are mounted and aligned. For simplicity, the following discussion mentions only a single storage disk in the disk drive. However, as those skilled in the art will recognize from the following discussion, the present invention is capable of use in disk drives having multiple disks mounted upon the spindle hub, the number of disks and associated data transducer heads affecting the vertical height of the disk drive.

Typically, the storage disk 102 is coated with a magnetic material that stores data in the form of longitudinal bipolar magnetic patterns written by digital saturation recording techniques within each concentric data track.

The actuator assembly 106 conventionally comprises a transducer head gimbal assembly 110 for each data surface, a carriage assembly 112, and a rotary voice coil actuator motor 114. In the rotary-type actuator assembly 106, the transducer head gimbal assembly 110 is attached to an outer end 116 of the carriage 112, while the actuator motor voice coil 114 is attached at a hub end 118 of the carriage. Centrally located along the carriage is a pivot 120 about which the actuator assembly rotates on a dual bearing assembly secured to the base housing 108. The pivot 120 is located adjacent the storage disk 102 such that the carriage 112 extends the upper and lower transducer head gimbal assemblies 110 over the surfaces of the storage disk 102.

Consequently, selective activation of the actuator voice coil motor (VCM) 114, rotates the actuator assembly 106 about the pivot 120 and accurately positions each transducer assembly 110 over the surface of the storage disk 102. As such, data can be written to, and can be read from, each data storage surface of the storage disk 102 by transducers within the transducer assembly 110.

Typically, the transducer assembly 110 includes a dual head transducer assembly 122 including e.g. a thin film inductive write head 200 and a shielded magnetoresistive thin film read element 202. One of the problems solved by the present invention is that the electrical width of the write element is wider than the effective electrical width of the magnetoresistive read element, in what is known in the art as a "write wide, read narrow" configuration. The read element 202 is longitudinally offset from the write element 200, and, because of radial skew imposed by the rotary actuator, the effective centerlines of the write and read elements are offset by an amount dependent upon radial position of the head structure relative to the data storage disk 102.

Figure 2:
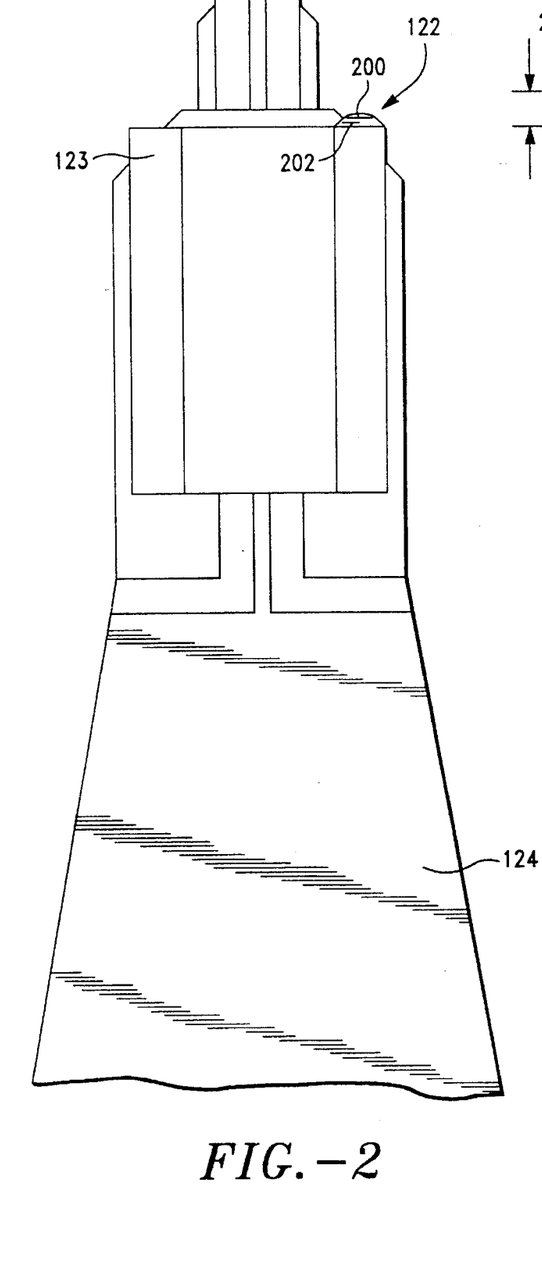
FIG. 2 is a schematic of a head-gimbal assembly of the FIG. 1 HDA including a dual-head transducer assembly of a write-wide inductive thin film write element and a read-narrow magnetoresistive read element.

The transducer assembly 122 is formed at an outer end of one rail of e.g. a two rail aerodynamic slider 123, as shown for example in FIG. 2. In accordance with conventional practice, the magnetoresistive (MR) read element 202 is formed on the slider first, in order to take advantage of the smoothness of the finished slider end surface. After the MR read element is formed, the thin film inductive element 200 is formed over the MR read element 202.

A flexure assembly 124 includes a gimbal secured to the slider and to a load beam. The load beam provides a preloading gram force to the slider to bias it toward the facing disks storage surface. The flexure assembly 124 connects at one end to the carriage; another end supports a slider 123 and the read/write elements over the disk surface. When the storage disk 102 is not rotating, the slider 123 and transducer assembly 122 rest upon a radially inward landing zone of the disk surface. On the other hand, when the storage disk 102 is rotating, the slider 123 overcomes the load beam spring bias and "flies" several microinches above the disk surface on an "air bearing" in accordance with what is known in the art as Winchester technology. During flight, the actuator assembly 106 positions the transducers 122 over the multiplicity of concentric data tracks defined on the oppositely facing storage surface of the storage disk 102 so as to read servo and user data and to write user data. However, when the disk drive is deactivated, the sliders 123 are moved in unison by the carriage assembly 112 to the inner landing zone and "parked" such that they will not damage the surface of the disk 102 by coming into contact with it.

Each surface of the disk carries a multiplicity of spaced apart concentric tracks 126. Each track is divided into an equal number of circumferential divisions 128, e.g., eighty-eight. These divisions are generally arced along the disk radius in accordance with an arc defined by the head and the rotary actuator. Each division 128 begins with a servo sector or "wedge" and is followed by a user data sector. The head position servo information is included in each servo wedge and the user data is recorded in each data sector. Since the servo information is included on the data surface, the servo sectors are said to be "embedded" in that they lie interspersed among the data sectors. Each servo wedge contains information used for accurate positioning of the transducers over each selected data track, so that user data may be written to, or read from, an adjacent data sector. A detailed discussion of the format of the servo information within each servo wedge appears below with respect to FIGS. 4, 5 and 6.

The disk drive preamplifier/write driver circuit 107 is connected, via a flex circuit 109, to the actuator assembly 110 so that electrical signals may reach the head transducer assemblies 122 via minute wires carried along the side of the carriage 112 and load beam 124. The signals leaving and entering the HDA 100 via the flex cable 126 are utilized by a drive microcontroller 103 and other electronics including a motors control ASIC 105 which supplies driving signals to operate the spindle motor and the rotary actuator, a PRML read/write channel 107 which receives and decodes coded data from the disk and which encodes and delivers coded data to the write driver portion of the IC 107. A disk drive electronics ASIC 109 implements a SERDES/ENDEC function, and ECC function, a data sequencer, a memory controller, a bus level interface, and a microprocessor interface for interfacing the microprocessor 103 with other circuits including a DRAM buffer 111 which contains microprocessor program instructions as well as data blocks being transferred between a host (not shown) and the data storage disk 102. The microprocessor 103 implements a state-space closed loop servo for controlling positioning of the rotary actuator 106. During track settling and following operations, the closed loop servo receives actual position samples from position information within embedded servo wedges via the read element, and separately estimates position, velocity and actuator bias force in order to generate and put out a control value via the motors control ASIC 105 to control head position. An internal data, address, control bus structure 113 interconnects the microprocessor 103, motors control ASIC 105, PRML read/write channel ASIC 107, disk drive electronics ASIC 109 and DRAM buffer chip 111. A connection to the host computing equipment is provided by a drive interface bus 115.

FIG. 2 depicts a schematic plan view of the transducer assembly 110 facing the disk storage surface. Specifically, the transducer assembly contains e.g. a thin film inductive write element 200 and a thin film magneto-resistive read element 202 formed as a separate part of the transducer assembly. As shown in the FIG. 2A diagrammatic enlargement of FIG. 2, the MR read element 202 is physically and electrically narrower than the thin film inductive write element. Additionally, the read and write heads are longitudinally separated by a distance 204 which in practice is approximately 4 µm. Furthermore, the centerline of the read element 202 is also laterally offset from a centerline of the write 200 by a predetermined distance 206, which in practice is approximately 0.65 µm in a preferred head assembly design.

Figure 2A:
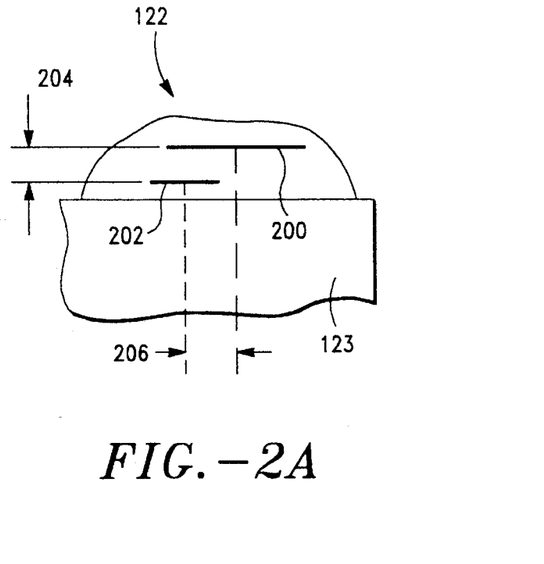
FIG. 2A is an enlargement of the dual-head transducer assembly.

The electrical width, of the inductive write head 200 (which corresponds to the width of the linear portion of the head's response curve) is typically 25% of the track pitch (track centerline to adjacent track centerline distance). In contrast, the electrical width of the read element 202 is only about 60% of the electrical width of the write element 200 because of the significant non-linear response characteristics of the MR read element 202, hence the linear response portion of the electrical width of the read head is limited to only about 16% of the track pitch. The consequences flowing from this fact are that the MR read element has only a very narrow band of sufficiently linear response to detect head position as a function of relative burst amplitude. The present invention implements a novel data track identification and head positioning technique in order to utilize more efficiently and effectively this very narrow MR read head linearity region for effective head positioning by the servo loop.

Figure 3:
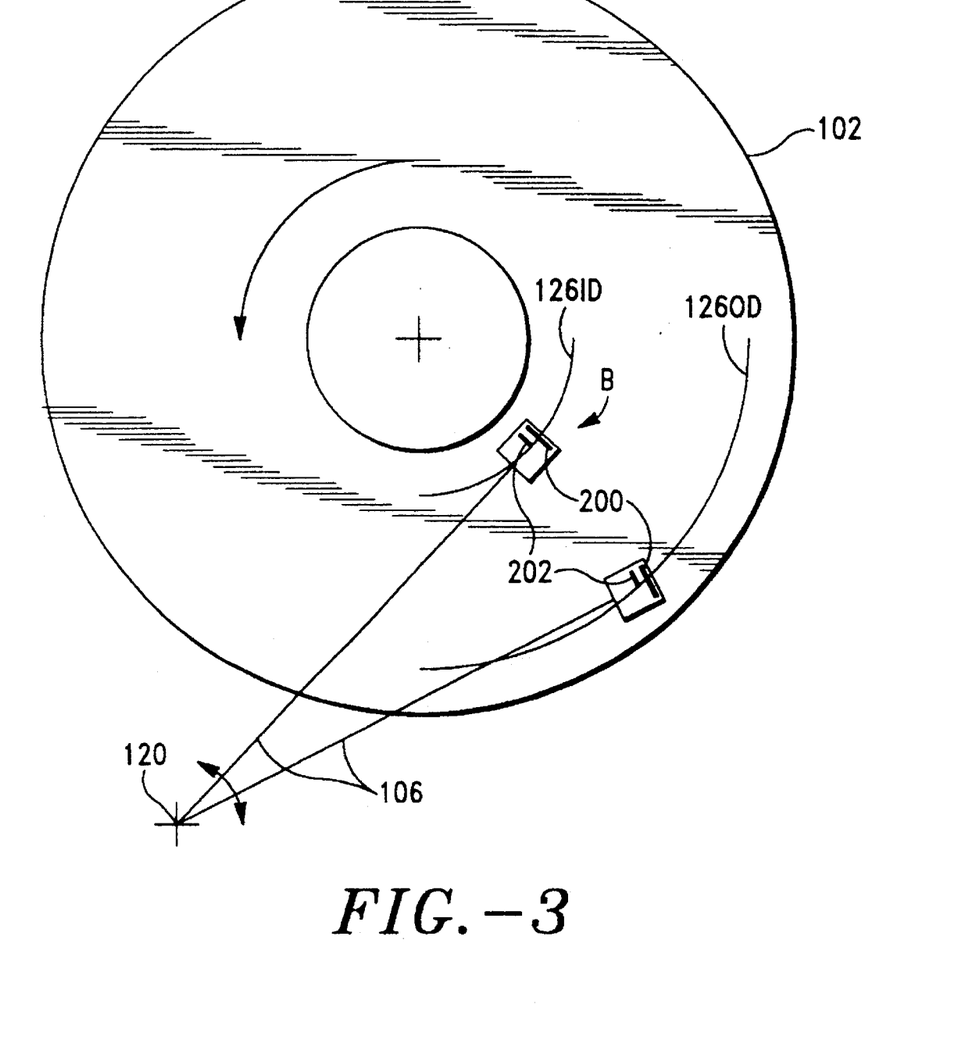
FIG. 3 depicts the transducer head assembly at two different positions with respect to tracks in the disk surface.

FIG. 3 diagrammatically depicts the alignment of the transducer head assembly with respect to two tracks 126 on the disk surface: an outside diameter track 126OD at a first radial position A, and an inside diameter track 126ID at a second radial position B. In the first position (position A), the two transducer heads 200 and 202 are e.g. closely aligned with the centerline of the track, i.e., the center of the track passes through the electrical center of each head. In contrast, in the second position (position B), the two heads are e.g. no longer aligned with the track centerline, i.e., the center of one head (write head 200) is aligned with the centerline of track 126ID, but the center of the other head (MR read head 202) is substantially offset from the center of the track 126ID. In accordance with principles of the present invention, each servo wedge 502 is divided up into two portions: an initial servo preamble portion 504, and a servo position portion 506 including e.g. four circumferentially sequential, radial offset servo bursts A, B, C and D (see FIG. 5A). To enable the write head 200 to follow the track, the servo position portion 506 is radially offset from the servo preamble portion 504 by an amount which is related to the amount of offset manifested between the write head 200 and the read head 202 at a particular track location. Accordingly, the servo head position information can be read by the MR read element 202 and utilized to center the write head 200 over the centerline of the track being followed, even though the read head is offset by the head skew distance from the track center. A servo loop processes the servo head position information read by the MR head 202 from the radially offset servo position portion 506 of the servo wedge 502 in order to determine absolute position of the read head and to generate a head position control signal to reposition and align the head structure (either the MR read head 202 or the inductive write head 200) with the center of the track (depending upon whether a data reading operation or a data writing operation will follow. This servo control process is iteratively repeated, so that during track following, the head assembly is maintained in alignment with the selected data track being followed.

Figure 4A:
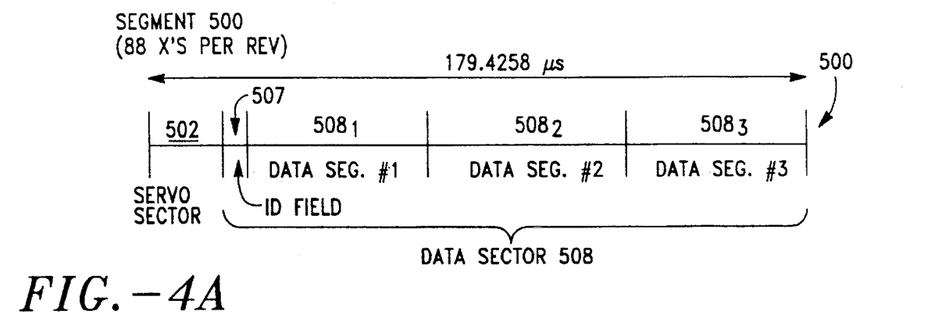
FIGS. 4A–D depict a detailed diagram the contents of a wedge of one of the concentric tracks including, a servo sector, an identification (ID) field, and a plurality of data segments.

Specifically, FIG. 4A depicts the general contents of a track segment 500 (two sectors: a servo wedge 502 and a data sector 508) of a track 126 on the disk 102. A single track 126 is comprised of a series of track segments 500 including servo wedges 502 and data sectors 508. Each servo wedge 502 contains servo information that provides absolute position information to the control circuitry of the disk drive via the read element. The data sectors 508 contain a data sector identification field 507 and a series of data segments 508₁, 508₂, and 508₃. There are approximately 88 data segments 500 per revolution of the disk, and so there are 88 servo wedges 502 and 88 data sectors 508. For a 2.5 inch diameter disk rotating at 3800 rpm, each segment 500 is approximately 179.4258 µsec. in duration, depending upon spindle speed tolerances.

The pattern of the servo information contained in the servo wedge 502 is read by the read head during a servo sector interval. The servo pattern is sampled by the MR head 202 and sample values are processed by an analog-to-digital converter and a microcontroller. The servo wedge 502 is also read and processed during seeking operations, i.e., when the actuator 106 moves the head assembly and transducers 122 from one radial track location to another radial track location. Each servo wedge 502 is also read and processed during track following operations, i.e., when the transducers 122 are following the centerline of the data track such that data is either read or written from the followed data sector 508.

The servo wedge interval duration is marked in terms of "T" periods wherein T is a basic clock cycle period of e.g. 25 nsec. (repeating at 40 MHz). The servo wedge interval has a nominal duration of 694T (17.35 µsec.), and preferably there are 88 sector intervals prerecorded in each concentric data track on each data surface of each of the disks within the drive. The servo wedges are equally spaced apart and are embedded, at fixed intervals, at the beginning of the data sectors 508. The tracks 126 are banded into radial bands or zones, with each zone having a data transfer rate adapted to change in relative velocity between the head and disk, the highest data transfer rate being at the radially outermost track zone of the disk, and the lowest data transfer rate being at the radially innermost track zone of the disk. A zoned data recording arrangement for a 2.5 inch form factor disk drive is described in commonly assigned U.S. Pat. No. 5,255,136, the disclosure thereof being incorporated herein by reference.

Each servo sector interval is prerecorded using the write head which is precisely positioned during servo writing with the aid of a servo writer system, in accordance with principles described in commonly assigned. U.S. Pat. No. 4,920,442, for example. As prerecorded by the servo writer system, and as diagrammed in FIG. 4B, each servo wedge 502 preferably includes a 168T pre-burst gap 510, a 72T automatic gain control (AGC) field 512, a 42T servo synchronization period 514, a 37T servo address mark field 516, a 9T index bit field 518, a 117T track number identification field 520, a 9T DC erase period 522, a plurality of 54T servo bursts 521 523, 525 and 527 (A, B, C, and D bursts), and a 24T post burst gap 526. The specific arrangement of the servo bursts and the process by which they are used to provide fine head position control is discussed below in greater detail.

Figure 4B:
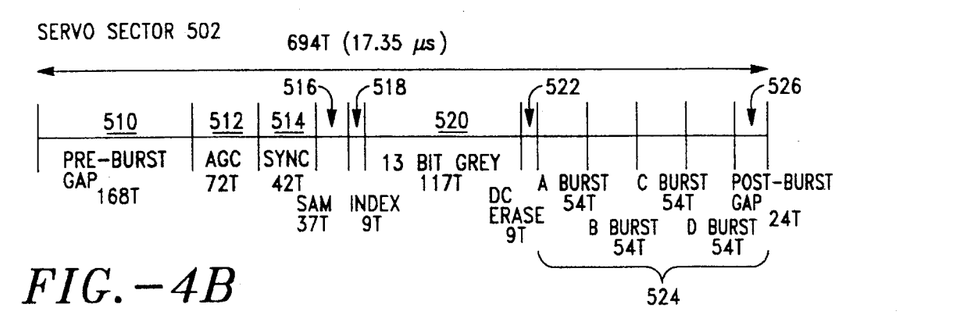

The AGC field 512 is prerecorded with a 3T repeating pattern (100 s), which are repeated 24 times. The 3T pattern is further to be understood as a positive (or negative) going flux reversal pulse, followed by two non-active (T periods during which there are no flux transitions). The next 3T pattern is a negative (or positive) going flux reversal also followed by two non-active T periods during which there are no flux transitions. The AGC field is used to adjust the gain of the read channel electronics to a predetermined reference value prior to reading the burst amplitude of the servo bursts, as will be explained below.

It should be noted that servo preamble portion 504 comprising the AGC field 512, the sync field 514, the servo address mark field 516, and the index field 518 is recorded to be phase coherent from track to track throughout the radial extent of the bands of tracks, so that the MR head 202 may always read the values recorded therein irrespective of radial position. This phase coherence from track to track is diagrammed by hatching in FIG. 5A. Thus, the information recorded in the fields comprising the servo preamble portion 504 may be used to calibrate and normalize the gain characteristics of the read channel electronics for the following servo position information portion 506 such that the AGC field generates an electrical signal of known amplitude. During seek operations, the data amplitudes tend to vary; therefore, having a known AGC value for a servo sector interval is especially useful during track seeking operations.

The servo sync field 514 is a 42T pattern producing a pattern duration of 1.05 µsec. The servo sync field is also phase coherent from track to track throughout the radial extent of the sector. The servo sync field enables a master state machine located within the servo control circuitry to detect that the servo sector is presently being read and to set up timing windows for detecting subsequent fields within the servo sector, including particularly the servo address mark field. This approach avoids the need to use a phase locked loop to set up timing marking boundaries of the servo sector fields.

The servo address mark field 516 sets forth a servo address value which is intentionally designed to violate a mn length limited data encoding pattern otherwise present in all of the data zones for the data values which are recorded and read by the disk drive. The disk drive preferably employs a 0,4,4 run length limited data encoding scheme for use with a partial response, maximum likelihood synchronous data detection channel, such as the channel described in commonly assigned U.S. Pat. No. 5,341,249, the disclosure thereof being incorporated herein by reference. The servo address mark field is prerecorded with a 37T pattern. The servo address mark indicates to a data separator that the information immediately following in time comprises servo position information (as opposed to user data or other information). Detection of the servo address mark in the field 516 enables the servo detection circuitry to recover in proper sequence the servo position information recorded in the portion 506.

Disk position (rotation) information (as well as rotational velocity) is provided by reading frown the index field 518. If the servo wedge 502 is the first servo wedge within the data track, a prerecorded nine bit servo data pattern, i.e., 10 010 000 0, is generated to provided a once per revolution index marker. If the wedge is not the first wedge, then the index field is prerecorded with a nine bit zero value.

The radially offset servo position portion 506 of each servo wedge 502 includes coarse head position information, provided by the track number field 520, and fine head position information provided by the burst fields 521, 523, 525 and 527. The track number field 520 is e.g. prerecorded with thirteen bits, each comprising 9T periods, in accordance with a Gray code format. For example, for a binary track number of 000AH (hex), the Gray coded track address of 000FH is: 10 000 010 0 10 000 010 0 10 000 010 0 10 000 010 0 10 000 010 0 10 000 010 0 10 000 010 0 10 000 010 0 10 000 010 0 10 000 000 0 10 000 000 0 10 000 000 0 10 000 000 0. This pattern is consistent with the 0,4,4, run length limited data encoding pattern, and it is also consistent with a 3T pattern which limits the minimum time for flux transitions (ones between zeros) to occur not more frequently than once every third clock cycle. This limitation ensures that the servo track number will be reliably readable even though data may be recorded at a higher data transfer rate in some data zones, which marks the bandwidth limit of the read channel of the disk drive.

The DC erase gap 522 separates the track number field from the time staggered, radially offset A, B, C and D servo bursts 521, 523, 525 and 527. The A, B, C, and D bursts are each recorded with e.g. a 3T pattern repeated e.g. 18 times. The specific arrangement of the bursts with respect to the centerline of the data tracks is discussed below with respect to FIGS. 5 and 6. The servo bursts are followed by a post burst gap containing a 3T pattern that is repeated 8 times. Then, the data sector 508 is reached.

Figure 4C:
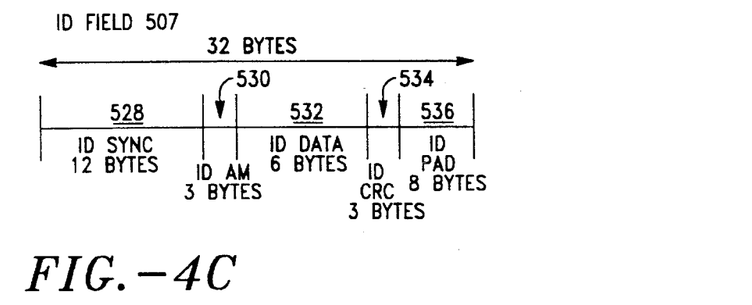

As shown in FIG. 4C, the data sector identification field (ID field) 507 contains 26 bytes of information including sync information (12 bytes), address mark (AM) information (3 bytes), data (6 bytes), CRC (3 bytes), and pad (8 bytes). The information in the ID field is recorded on the disk at a rate that is equivalent to the data rate used to record the data in the data segments that follow the ID field.

Specifically, the sync information portion of the ID field 507 contains a predefined bit pattern that the electronics use to synchronize the data processing circuitry to facilitate accurate reading of the remaining information in the ID field. The 3 bytes of address mark information creates a byte timing reference for framing user data symbols into bytes.

The data portion of the ID field contains a flag (1 byte), a number of count bytes (up to 3 bytes), a sector number (1 byte), and a cylinder/head number (1 byte). The flag indicates the status of the data sectors that follow the ID field, e.g., partial, defective, and the like. Each of the count bytes contains a number representing the number of bytes of data respectively contained in each of the data segments 508n that follow the ID field. The sector number indicates the data sector associated with a given ID field. Lastly, the cylinder/head number contains 5 bits that represent the cylinder number in which a given ID field is contained and 3 bits that represent the head number that reads data from the disk surface in which a given ID field is contained.

Additionally, the ID field contains 3 bytes of conventional CRC information to facilitate error detection of the information contained in the ID field. Illustratively, the CRC is produced using a conventional Reed-Solomon coding scheme. Alternatively, the CRC information could be used in conjunction with conventional error correction techniques, e.g., parity information, data interleaving, data redundancy, and the like, to correct as well as detect errant ID field information. Lastly, the ID field contains an ID pad that provides a fixed amount of time for the data processing electronics to switch, as needed, from a read mode to a write mode. As such, after reading the ID field, the electronics is capable of writing to the data segment that occurs directly after the ID pad.

Figure 4D:
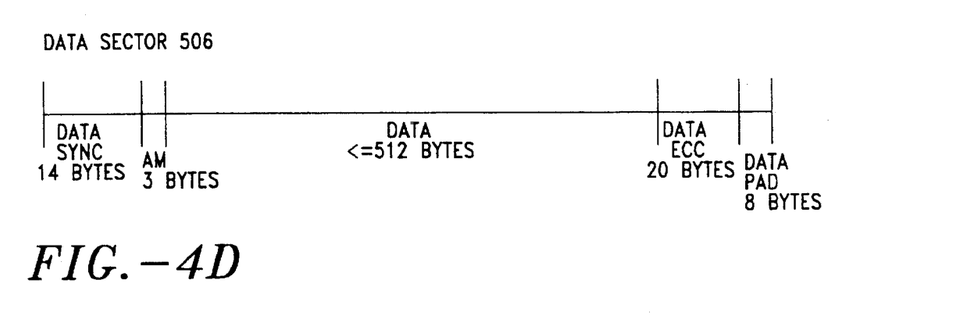

Each of the data segments 508n following a given ID field contains a maximum of 546 bytes including data sync field (14 bytes), address mark information (3 bytes), data (up to 512 bytes), data error correction code (20 bytes), and a pad (8 bytes). These portions of each data segment function exactly in the same manner as the ID field portions. Specifically, the sync field provides synchronization information for the electronics, the address mark indicates the segment address, the data field contains user data, and the pad provides a time period during which the electronics switches (if presently in a write mode) to a read mode to read the next servo sector. The data segment contains an error correction code field to facilitate correcting errors in the data read from the data field. Typically, the error correction code utilizes a conventional Reed-Solomon coding scheme to detect errors in the data. Additionally, by using conventional data interleaving and data redundancy methods, the detected errors are corrected by the data processing electronics.

Figure 5A:
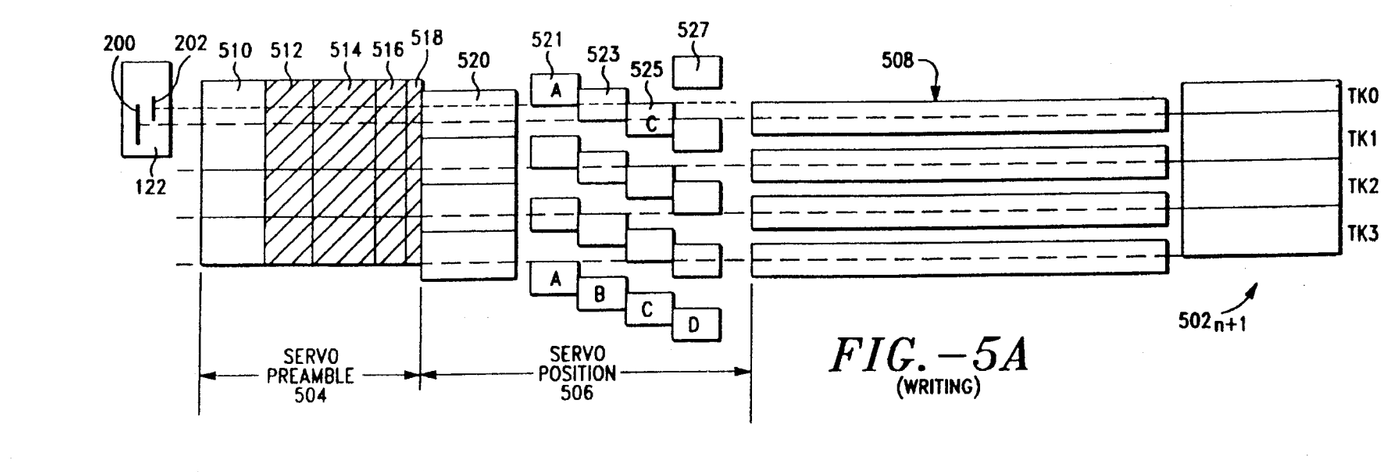
FIG. 5A depicts radial alignment of a write wide, read narrow head assembly relative to radial positions of servo preamble, servo positioning, and user data track sectors of a data track being followed during data writing operations in accordance with an aspect of the present invention.
Figure 5B:
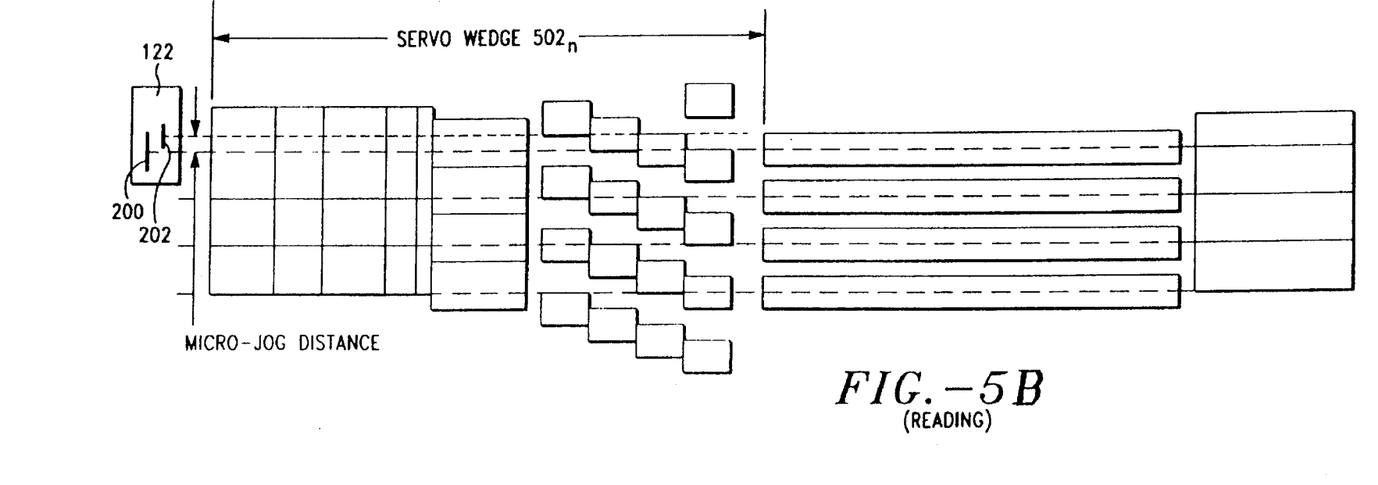
FIG. 5B depicts micro-jogging of the head assembly of FIG. 5A in order to carry out data reading operations in accordance with an aspect of the present invention.

FIGS. 5A and 5B depicts the relationship between the servo wedge preamble 504, the servo wedge position portion 506 and the following data sector 508 for both data writing and data reading operations. FIG. 5A schematically depicts the alignment of the write and MR read elements 200 and 202 with respect to the data track while the transducer assembly 122 is positioned for writing data to the data sector 508 of the track. In the FIG. 5A example, the head assembly 122 is positioned to cause the electrical centerline of the write element 200 to follow the centerline (long dashes) of track 0. In the arrangement of FIG. 5A, it will be appreciated that the centerline of the MR read element 202 (short dashes) coincide with edges of the A burst 521 and the C burst 525, and that the servo ID field 520 is displaced toward the read element centerline such that the read element will pass entirely through the servo ID field 520 for track 0 and thereby read only the Gray coded track ID information therein.

In contrast, FIG. 5B depicts realignment of the write and MR read elements 200 and 202 with respect to the data track while the transducer assembly 122 is positioned to read data from the track during a user data reading operation. In order to reach the read user data position, the transducer assembly 122 is micro-jogged by the micro-jog distance, so that the read element with the centerline (long dashes) of the data track. Micro-jogging is carried out as a partial track seeking operation, and may invoke control routines otherwise carried out during track settling operations to reposition the head assembly 122 within the data track being followed (in this example track 0). As shown in FIG. 5B, and in accordance with an aspect of the present invention, the single servo ID field 520 is radially offset on the disk from both the centerline of the servo sector preamble 504 and from the centerline of the following data sector 508 such that the MR read element will also pass entirely through only the single servo ID field 520 alter micro-jogging preceding a data writing operation. The micro-jogging distance shown in FIG. 5B is exaggerated for purposes of illustration, and in practice is less, such as +14% of track pitch at the disk inner diameter to −12% of track pitch at the disk outer diameter. Accordingly, in usual practice, the read element 202 would continue to read the A and C burst edges with resultant unequal burst amplitudes corresponding to the micro-jog distance, rather than reading the B and D burst edges as suggested in FIG. 5B (although the read element 202 could readily center on the B and D burst edges if, as shown in FIG. 5B the micro-jog distance in a particular example equaled a full one-third of track pitch). As such, the MR read element 202 effectively passes over and reads the ID field 520 during both read and write operations.

By radially offsetting the ID field 520, the transducer assembly 122 does not require a micro-jogging operation in order to align the MR read element 202 with the ID field 520 each time the ID field passes by the head assembly 122 during disk rotation. Thus, a single micro-jog is only needed to position the transducers over the data segments in switching from a user data writing operation to a user data reading operation. Additionally, by using a single ID field 520, more disk surface area can be used to store user data as compared to the prior art practice which required e.g. two micro-jog displaced ID fields.

The servo ID field 520 is written onto the disk during disk formatting by the servo writer. To write the ID field, the write head is offset from the servo centerline by a one-half micro-jog distance, e.g., which varies in length from track to track depending upon head skew (the greatest micro-jog distance being from +14% to −12%, as explained above). The ID field is then written to the disk. This positioning of the ID field permits the MR read element 202 to pass over the ID field 520 during both writing and reading operations without realigning (micro-jogging) the head assembly relative to the ID field 520 and without requiring plural ID fields, one for reading and one for writing as was the case with the prior art.

To further ensure that the read head accurately reproduces the information in the ID field, error correction coding can be provided. As such, any errors in the ID information are detected and corrected during disk drive operation. Alternatively, if an error is made in reading the contents of the ID field, the disk drive can retry to read the errant ID field. To provide the best possible alignment of the read head and the ID field for the retry, the read head is micro-jogged one-half of the micro-jog distance. As such, optimum alignment is achieved during the retry and the ID field should then be accurately read.

Figure 6B:
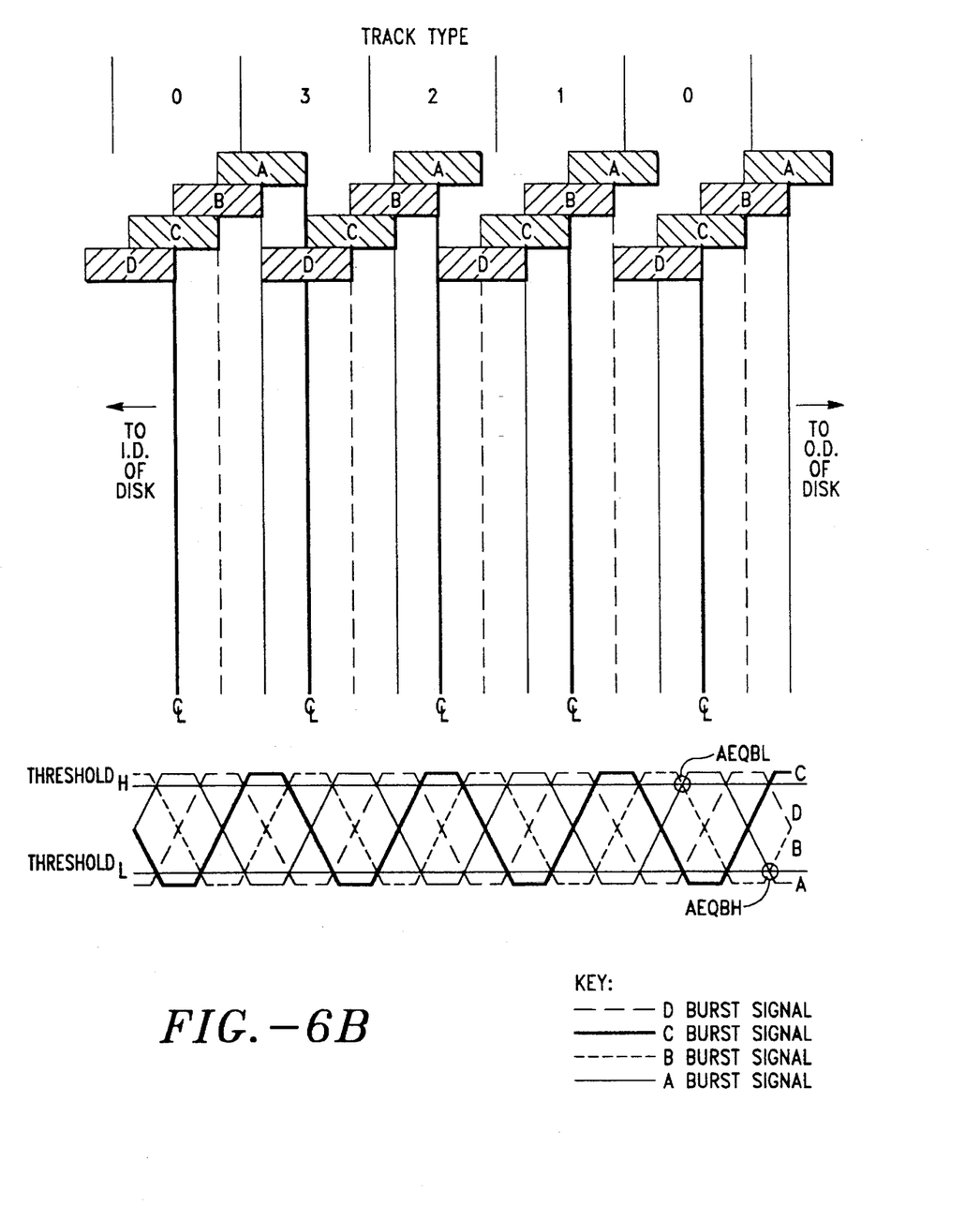

FIG. 6A depicts a portion of the disk containing the A, B, C and D burst fields 521, 523, 525, and 527 of a servo wedge 502. FIG. 6B associates electrical amplitude waveforms of signals read by the MR read element 202 from each burst as a function of radial displacement of the MR read element 202 relative to the A, B, C and D bursts.

As the MR read element 202 moves across a circumferential edge of a burst, an amplitude value will be induced in proportion to the fraction of the burst which passes by the MR read element. While the read element linear region is quite narrow, the resultant amplitude values graphed in FIG. 6B define fairly linear diagonal waveforms within the linear region of the head response curve, as shown in FIG. 2B. As mentioned above and as shown in FIG. 6B, the amplitudes of the various bursts have a quadrature phase relationship, meaning that the patterns repeat for every four tracks, and that each burst is offset radially from the other bursts by a fixed amount. As such, the diagonal segments of the burst signals which are overlaid with one another in FIG. 6B mark radial positions of the MR read element in which induced burst amplitude is substantially proportional to radial displacement of the head assembly 122 relative to the burst pattern of each track. The diagonal segments are bounded by flat saturation regions marking radial movement of the narrow MR read element 202 through the wider burst field, and the diagonal segments periodically reverse in sense as the head traverses the disk surface from an outer diameter (OD) to an inner diameter (ID) and vise versa.

By inspection of FIG. 6B, by establishing suitable high threshold and low threshold switch points (labeled $THRESHOLD_H$ and $THRESHOLD_L$) it is apparent that there are no radial positions of the head transducer assembly 122 that are not defined by a circumferential burst edge providing linear feedback. In fact, by providing the four burst pattern, there are always at least two linear signals whose relative amplitudes may be measured and differenced in order to determine the head position. Thus, for all radial positions of the head assembly 122, two amplitude values representing two servo burst edges may be selected and quantized in order to provide an incremental, linear position value. By combining this position value with the track number read from the track number field 520 in a preceding servo sector, an absolute position within a particular sector is determined. This absolute position is used by the servo control loop circuitry in both track seeking operations (including settling) and track following operations.

Specifically, the signal from the read head is quantized synchronously with the occurrence of the A, B, C, and D bursts as each servo sector passes beneath the read head. Those quantized values are stored in memory and, later compared to two levels, $THRESHOLD_H$ and $THRESHOLD_L$. Typically, these threshold levels are set to be no greater than the boundaries of the linear region of each burst signal. Additionally, the Gray coded track number associated with the present position of the MR read element 202 is decoded. The last two binary digits of the decoded track number are used to determine the position of the head. These last two digits represent one of four possible adjacent tracks that are represented by the relative amplitudes of the A, B, C, and D bursts. Next, the electronics compares the quantized levels of each of the bursts to the $THRESHOLD_H$ and $THRESHOLD_L$ levels. Those signals above the $THRESHOLD_H$ level and below the $THRESHOLD_L$ level are not used for position determination, i.e., these signals are deemed non-linear. Generally, for each position, two of the signals exceed these levels and two of the signals are in the linear region. From the track number and the information of which bursts are in their linear regions, the electronics determines the position of the head and produces a position value. Thereafter, in response to the position value, the servo control circuitry moves the transducer assembly to appropriately align the transducer assembly with the centerline of a data track.

Figure 7A:
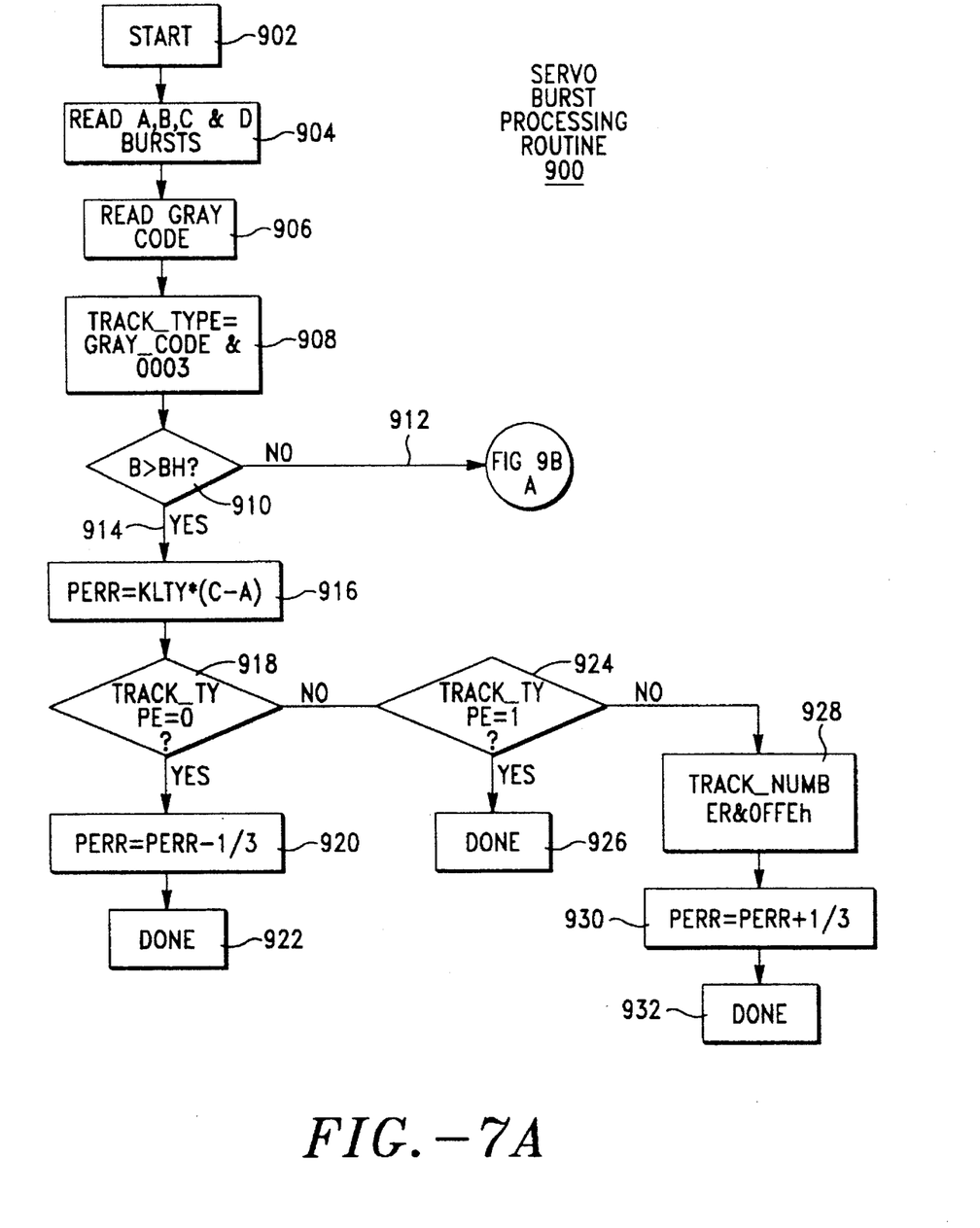
FIGS. 7A through 7C depict a flow chart of a servo burst processing routine that determines the absolute position of the transducer head assembly with a read-narrow MR read element.
Figure 7B:
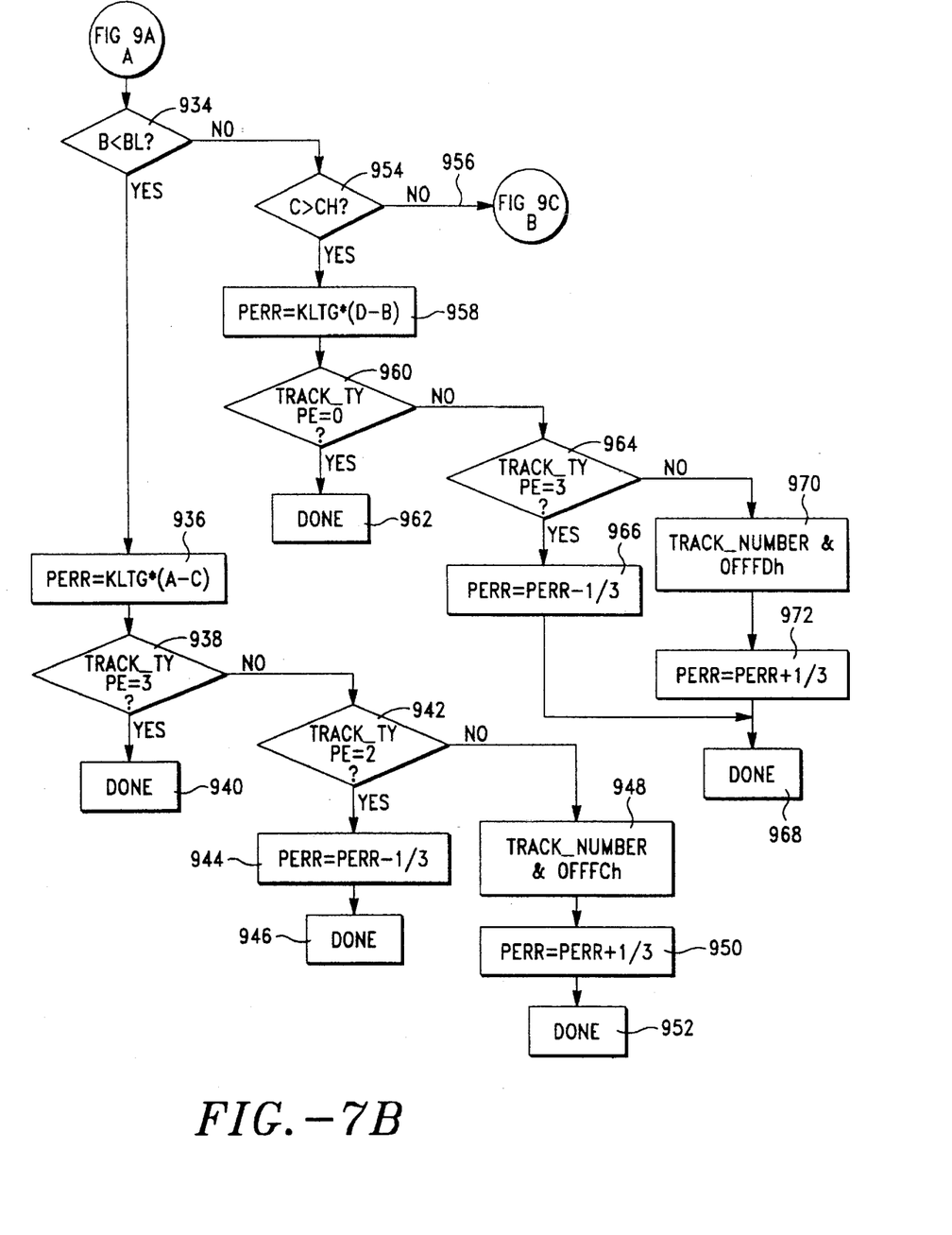
Figure 7C:
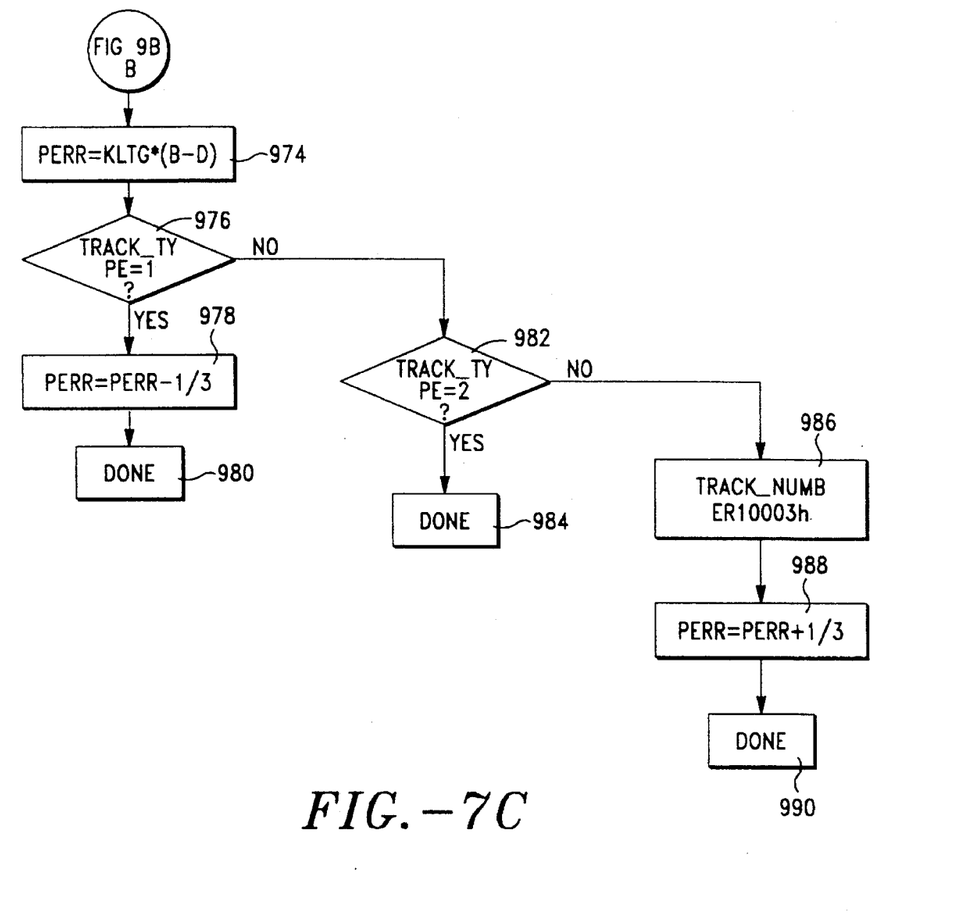

More specifically, FIGS. 7A–7C depicts a flow chart of a servo burst processing routine 900 for determining the absolute position of the transducer assembly relative to a particular servo sector. To best understand this routine, the reader should also refer to FIGS. 6A and 6B. To implement routine 900, the routine takes the form of a computer program typically executed by well-known data processing and control electronics including a microprocessor or microcontroller such as the μPD7870 12 microcontroller manufactured by NEC. As is common in the art, the routine is executed by the microcontroller at servo time on a servo interrupt service routine basis. From the depicted flow chart, those skilled in the art can readily select an appropriate microcontroller and program the selected microcontroller to execute the disclosed routine.

Specifically, the routine 900 is entered at node 902, generally labeled "START" in FIG. 7A. Prior to step 904, the A, B, C and D bursts are digitized at the time that each burst passes beneath the read head. In particular, the data processing electronics averages (low pass filters) the amplitude of each burst and synchronously digitizes the peak value of the amplitude of each burst. The digitized peak value of each burst is stored in memory. At step 904, the previously stored A, B, C and D burst values are recalled from memory.

Additionally, prior to step 906, the data processing electronics uses a data decoder to decipher the track number that is contained in the track number field that last passed beneath the read head. Specifically, the Gray code is deciphered and the track number is stored in a track number register. At step 906, the routine retrieves the track number from the track number register.

At step 908, the routine determines a "track type" from the track number. The track type is equivalent to the last two digits of the decoded track number, e.g., the two least significant bits. Thus, there are four track types, e.g., 00, 01, 10, and 11. These track types are respectively numbered 0, 1, 2, and 3 through the remainder of this discussion. These track types represent four adjacent concentric tracks. The routine ultimately produces a control value that is used by the servo control circuitry to align the read head with the centerline of one of these four adjacent tracks. Generally, the read head is aligned with the centerline of the nearest track.

At logical node 910, the value of the B burst is compared to a threshold level (B) (see FIG. 6B). This threshold level indicates the boundaries of the saturation region for the MR read head, i.e., the region that becomes non-linear as a function of radial displacement. Specifically, the threshold has an upper boundary ($B_H$) and a lower boundary ($B_L$). Note that the boundaries for the A, C and D bursts are $A_H$, $A_L$, $C_H$, $C_L$, $D_H$, and $D_L$. If the B burst value is less than the threshold value, the routine proceeds along NO path 912 to FIG. 7B. Alternatively, if the B burst value is larger than the threshold value, the routine proceeds along YES path 914 to step 916. As such, if the B burst is in the non-linear portion of the curve, then it is known that bursts A and C are within their linear regions. Consequently, the YES path leads to a portion of the routine that processes bursts A and C to determine the absolute position of the read head.

At step 916, a position error (PERR) value is determined. This position error value indicates the relative position of the read head with respect to the nearest track center. As such, the position error plus the track number indicates the absolute position of the read head. The position error is determined by subtracting the amplitude of the A burst from the amplitude of the C burst and then multiplying the result with a conversion coefficient (KLTG). The conversion coefficient is the slope of the linear region of the response curve. Mathematically the calculation of PERR is represented by equation 1:

$$PERR = KLTG(C-A) \qquad (1)$$

where:

PERR is the position error value;

KLTG is a conversion coefficient that converts the difference between burst values into an off-track position;

C is the peak amplitude of the C burst; and

A is the peak amplitude of the A burst.

The KLTG value is determined using a calibration routine during start-up of the disk drive. The value of KLTG is approximately the slope of the diagonal portion of the burst signals. This calibration routine measures the amplitude of the A and B bursts at the point where the amplitude of the A burst is equal to the amplitude of the B burst. As shown in FIG. 6B, the A and B bursts are equivalent at two points (labeled AEQBH and AEQBL). The amplitude values at these two points are used in equation 2 to compute the KLTG value.

$$KLTG = \left( \frac{1}{AEQBH - AEQBL} \right) \cdot \left( \frac{1}{3} \right) \qquad (2)$$

Once the value of PERR is computed using equation 1, the value is temporarily stored in a register for subsequent use by the routine 900.

At step 918, this logical node queries whether the track type is 0 or not. If the track type is 0, the routine proceeds along the YES path to step 920. As such, at step 920, the PERR value is reduced by one-third. This adjustment compensates for the present offset of the MR head from the track centerline. The adjusted position error value is used by the servo control circuitry to position the read head over the center of the track represented by track type 0. At step 922, the interrupt routine is completed.

Alternatively, if at node 918 the track type is not 0, the routine proceeds along the NO path to logical node 924. At node 924, the routine queries whether the track type is 1. If the track type is 1, then the read head is presently centered on that track and the position of the read head does not need adjusting. Consequently, the routine ends at step 926.

If the track number is not 1, then the routine proceeds, along the NO path emanating from node 924, to step 928. At this point, it is known that the B burst is saturated and the track type is neither 0 nor 1. As such, the read head is straddling track types 2 and 3 (see FIG. 6B). At step 928, the routine arbitrarily sets the track type to 2. Thereafter, at step 930, the position error value is reduced by one-third to produce a value that facilitates aligning the read head with the track center. At step 932, the routine is completed.

If the B burst is not saturated, the routine proceeds along NO path 912 emanating from logical node 910 to step 934 in FIG. 7B. At step 934, the routine tests whether the B burst amplitude exceeds the lower B burst threshold value ($B_L$). If the threshold is not exceeded, the routine proceeds along the YES path to step 936. At step 936, PERR is calculated using equation 3.

$$PERR = KLTG(A-C) \qquad (3)$$

where:

PERR is the position error value;

KLTG is a conversion coefficient that converts the difference between burst values into an off-track position;

C is the peak amplitude of the C burst; and

A is the peak amplitude of the A burst.

At step 938, the routine queries whether the track type is 3. If the track type is 3, then the read head is presently aligned with a track centerline. Consequently, no adjustment to the position of the read head is necessary and the routine ends at step 940.

If, at step 938, the track type is not 3, the routine tests, at step 942, whether the track type is 2. If the track type is 2, the routine adjusts, at step 944, the position error by reducing the error by one-third. Using the adjusted position error, the servo control circuitry adjust the read head position to align the read head with the centerline of a track.

If at node 942, the track type is not 2, the routine proceeds along the NO path emanating from node 942, to step 948. At step 948, the track type is set to 0 and, at step 950, the position error is increased by one-third. The routine ends at step 952.

Returning to node 934, if the B burst value is larger than the B burst lower threshold level ($B_L$), then the routine proceeds from step 934 to step 954. At step 954, the routine queries whether the C burst is larger than the upper C threshold level ($C_H$). If the C burst is not larger than its upper threshold, the routine proceeds along NO path 956 to FIG. 7C. However, if the C burst is larger than its threshold, the routine proceeds to step 958. At step 958, the PERR is calculated using equation 4.

$$PERR = KLTG(D-B) \tag{4}$$

where:

PERR is the position error value;

KLTG is a conversion coefficient that converts the difference between burst values into an off-track position;

D is the peak amplitude of the D burst; and

B is the peak amplitude of the B burst.

At step 960, the routine determines if the track type is 0. If the track type is 0, then the read head is presently aligned with a centerline of a track and needs no further adjustment. As such, the routine ends at step 962.

If, however, the track type is not 0, then the routine queries at step 964 whether the track type is 3. If the track type is 3, the position error is reduced by one-third to facilitate aligning the read head with the centerline of a track and, thereafter, the routine ends at step 968.

If the track type is neither 0 nor 3, then the read head is straddling track types 0 and 1. Consequently, at step 970, the routine sets the track type to 1 and, thereafter, at step 972, increases the position error by one-third. The routine ends at step 868.

Returning to logical node 954. If the C burst is not presently exceeding its upper threshold, then the routine proceeds along NO path 956 to step 974 in FIG. 7C. At step 974, the position error is calculated using equation 5.

$$PERR = KLTG(B-D) \tag{5}$$

where:

PERR is the position error value;

KLTG is a conversion coefficient that converts the difference between burst values into an off-track position;

D is the peak amplitude of the D burst; and

B is the peak amplitude of the B burst.

At step 976, the routine queries whether the track type is 1. If the track type is 1, the routine proceeds to step 978 and reduces the value of the position error by one-third. Thereafter, the routine ends at step 980.

At step 976, if the track type is not 1, then the routine queries, at step 982, whether the track type is 2. If the track type is 2, the read head is presently aligned with a track centerline and the routine ends at step 984. However, if the track type is neither 1 nor 2, then the read head is straddling track types 2 and 3. Consequently, the routine sets, at step 986, the track type to 3 and, at step 888, increases the position error by one-third. Thereafter, the routine ends at step 990.

As a result of the foregoing, including the servo burst routine, the special servo pattern, and a single ID field 520 within each embedded servo sector, a bit density of 503.5 megabits per square inch, a track density of 5300 tracks per inch, and a PRML data channel, a disk dive using an MR read element may store as much as 270 megabytes or more of user data on a single 2.5 inch diameter disk.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is being claimed is:

1. In a disk drive including a magnetic data storage disk rotating relative to a base, a data transducer assembly positioned at concentric data track locations by a rotary actuator referenced to the base and controlled by a closed loop servo circuit, the data transducer assembly including a write element, and a read element offset longitudinally from the write element such that when at least some of the track locations are being accessed by the data transducer assembly, a centerline of a magnetic path on the disk read by the read element is offset from a centerline of a magnetic path written to the disk by the write element by a micro-jog distance, and a plurality of servo wedges embedded within the data tracks wherein each servo wedge includes a servo preamble, a single servo identification field, and a plurality of circumferentially sequential, radially offset servo bursts, an improved method for centering the data transducer assembly relative to a centerline of a track to be followed, the method comprising the steps of:

for each servo wedge and each track, forming a respective servo preamble at a first radial displacement relative to the centerline of the track, forming a respective single servo identification field at a second radial displacement related to the micro-jog distance from the centerline of the track, and forming at least a pair of servo bursts to have oppositely facing burst edges in registration, the oppositely facing burst edges being offset from the centerline of the track by the micro-jog distance, during disk drive data writing operations, reading with the read element the respective servo preamble, the respective single servo identification field, and the pair of servo bursts to obtain relative burst amplitudes therefrom in order to supply write-mode position error signals to the closed loop servo circuit to align the write element with the centerline, and during disk drive reading operations, displacing the data transducer assembly from the centerline by the microjog distance, and reading with the read element the respective servo preamble, the respective single servo identification field, and the pair of servo bursts to obtain relative burst amplitudes therefrom in order to supply read-mode position error signals to the closed loop servo circuit to align the read element with the centerline.

2. The method set forth in claim 1 wherein the steps of forming the respective servo preamble, forming the respective single servo identification field and forming at least a pair of servo bursts are carried out by recording magnetic flux transition patterns during a disk drive servo writing operation.

3. The method set forth in claim 1 wherein the step of forming at least a pair of servo bursts comprises forming four circumferentially sequential, radially offset bursts at a relative offset of a one third track pitch from burst to burst.

4. The method set forth in claim 1 wherein the micro-jog distance varies as a function of disk radius, and the steps of forming the respective single servo identification field and forming the pair of servo bursts include the step of adjusting the micro-jog distance for each data track location as a function of the disk radius.

5. A disk drive including:

a base, a magnetic data storage disk rotating relative to the base, at least one data transducer assembly positioned at concentric data track locations by a rotary actuator mounted to the base and controlled by a disk drive closed loop servo circuit, the data transducer assembly carried on an air bearing slider and including a thin film inductive write element and a thin film magneto-resistive read element offset longitudinally from the write element such that a centerline of a magnetic path on the disk read by the read element is offset from a centerline of a magnetic path written to the disk by the write element by a micro-jog distance, a plurality of servo wedges embedded within each data track wherein each wedge includes for the track a servo preamble recorded at a first radial displacement relative to the centerline of the track, a single servo identification field recorded at a second radial displacement related to the micro-jog distance, and a plurality of circumferentially sequential, radially offset servo bursts having oppositely facing and aligned burst edges offset from the centerline of the track by the micro-jog distance, so that during disk drive data writing operations, the read element reads the servo preamble field, the single servo identification field, and the pair of servo bursts to obtain relative burst amplitudes therefrom in order to supply write-mode position error signals to the closed loop servo circuit to align the write element with the centerline, and during disk drive data reading operations, the closed loop servo displaces the transducer assembly from the centerline by the micro-jog distance so that the read element reads the servo preamble, the single servo identification field, and the pair of servo bursts to obtain relative burst amplitudes therefrom in order to supply read-mode position error signals to the closed loop servo circuit to align the read element with the centerline of the track.

* * * * *